United States Patent
Kaminsky et al.

[11] 4,010,906
[45] Mar. 8, 1977

[54] MACHINE FOR WINDING THREAD INTO TUBULAR SHELLS WITH CONVEX ENDS

[76] Inventors: Igor Vasilievich Kaminsky, ulitsa Lenina, 51, kv. 12, Severodonetsk Voroshilovgradskoi oblasti; Viktor Dmitrievich Protasov, 9 Sokolnicheskaya ulitsa, 4, korpus 2, kv. 32, Moscow; Viktor Alexeevich Pimenov, ulitsa Donetskaya, 35, kv. 57, Severodonetsk Voroshilovgradskoi oblasti; Vyacheslav Alexandrovich Barynin, ulitsa Chernyakhovskogo, 4, kv. 81, Khotkovo Moskovskoi oblasti; Vladimir Vladimirovich Shestakov, ulitsa Lisichanskaya, 41, kv. 30, Severodonetsk Voroshilovgradskoi oblasti; Vladimir Larionovich Polyakov, ulitsa Chernyakhovskogo, 4, kv. 69, Khotkovo Moskovskoi oblasti; Genrikh Fedorovich Severov, ulitsa Pervomaiskaya, 29, kv. 41, Severodonetsk Voroshilovgradskoi oblasti; Aron Iosifovich Zaitsev, ulitsa Donetskaya, 53, kv. 40, Severodonetsk Voroshilovgradskoi oblasti; Stanislav Vasilievich Stepanov, ulitsa Mayakovskogo, 11b, kv. 58, Severodonetsk Voroshilovgradskoi oblasti, all of U.S.S.R.

[22] Filed: May 12, 1975

[21] Appl. No.: 576,442

[52] U.S. Cl. ............................................. 242/7.21
[51] Int. Cl.² ...................................... B21F 17/00
[58] Field of Search ............... 242/7.21, 7.22, 7.23, 242/2; 156/425

[56] References Cited

UNITED STATES PATENTS

| | | | |
|---|---|---|---|
| 3,232,545 | 2/1966 | Ross et al. | 242/7 |
| 3,250,493 | 5/1966 | Burkley et al. | 242/158 |
| 3,334,824 | 8/1967 | McClean | 242/7 |

Primary Examiner—Jerry W. Myracle
Attorney, Agent, or Firm—Steinberg and Blake

[57] ABSTRACT

A machine for winding shells with convex ends on mandrels using thread such as resin-impregnated fibreglass threads comprises a mechanism for rotating the mandrel around its longitudinal axis, a thread guide installed on a traverse carriage located on a horizontal guide, and a mechanism for moving the carriage over the horizontal guide. The thread guide is mounted on the carriage with a provision for moving relative to it in the direction perpendicular to the mandrel axis. The horizontal guide is arranged parallel to the mandrel axis. The mechanism for moving the carriage along the horizontal guide includes of an endless flexible linkage whose position is space is set by master guide; the shape of these master guides in the rectangular system of coordinates x, y depends on the relation:

$$y = \int \sqrt{a^2 \left(\frac{d\psi}{dx}\right)^2 - 1} \, dx + C.$$

The flexible linkage is connected with the mandrel-rotating mechanism and with the traverse on which the thread guide is mounted. The winding machine also comprises a vertical guide on which a vertical-guide carriage is mounted hingedly jointed to the endless flexible linkage and another horizontal guide on which a carriage is mounted capable of moving along it, the latter carriage being connected rigidly with the vertical guide and linked kinematically with the traverse carriage on which the thread guide is mounted. The vertical-guide carriage is installed on the vertical guide with a provision for moving along it and is intended to transmit motion to the vertical guide from the endless flexible linkage.

11 Claims, 6 Drawing Figures

4,010,906

MACHINE FOR WINDING THREAD INTO TUBULAR SHELLS WITH CONVEX ENDS

INTRODUCTION

The present invention relates to devices for winding shells and, more particularly, it relates to machines for winding shells with convex ends on mandrels with braids, threads or strips, e.g. of fibreglass impregnated with resins.

Such shells can be employed for example, as uniformly-strong vessels working under internal pressure, etc.

STATE OF THE ART

Known in the previous art are winding machines comprising a thread guide, mechanism for moving said thread guide, and a mandrel-rotating mechanism. The mechanism for moving the thread guide consists of an endless chain or a gearing chain running over two sprockets. One of the chain links is hingedly jointed to the thread guide.

As said link moves along straight path, the thread guide executes straight and uniform motion along the mandrel; when the chain link moves around one of the sprockets, the thread guide executes a sinusoidal motion to a stop after which it moves again in a sinusoid pattern but in another direction.

These known machines cannot provide for winding the shells together with the curved ends because the period of sinusoidal motion is insufficient for this purpose and the thread guide after reversing its motion moves away from the curved end before laying threads on the latter.

These machines can be used for winding pipes of limited length.

Known in the art is a shell-winding machine comprising a mandrel rotating mechanism, a carriage with a thread guide and a mechanism for moving the carriage relative to the mandrel. The latter mechanism consists of an endless flexible linkage whose position in space is set by master guides; the shape of the master forms coincides exactly with the external profile of the mandrel. The flexible linkage transmits motion from the mandrel-rotating mechanism to the carriage which mounts the thread guide with the aid of a drive link which is installed with a provision for moving in a transverse slot of the carriage and is connected with one of the points of the endless flexible linkage.

In the course of operation of this machine the thread guide follows a trajectory coinciding with the external profile of the mandrel and places the threads on the mandrel at an angle of nearly 90° to the mandrel rotation axis.

This machine is not fit for winding shells with curved ends because in winding shells with curved ends the threads should always be laid at a considerably smaller angle than 90° to the mandrel rotation axis; besides, the motion of the thread guide should be appropriately controlled for winding the curved ends. The known machine cannot wind shells with the threads places at an angle to the mandrel rotation axis differing considerably from 90°; in addition, the machine has no mechanisms for controlling the movement of the thread guide while winding the ends.

Also known in the art is a machine for winding shells on a mandrel comprising a mandrel-rotating mechanism, a thread guide and a mechanism for moving the latter.

In this machine the mechanism for moving the thread guide is constituted by an electrohydromechanical system with programmed control and a servo mechanism. The operating element of the system is a servometer which moves the thread guide in accordance with the programme recorded on the chart tape of a rotating drum.

This disadvantages of this machine is the complexity of the mechanism for moving the thread guide which affects adversely the reliability of the machine, reduces the accuracy of thread laying; besides this machine is difficult to operate.

Still another known machine for winding sheels with end plates comprises a mandrel-rotating mechanism, a thread guide and a mechanism for moving the latter.

The thread guide is mounted on a carriage which is operated by a chain drive. In the extreme positions the carriage operates a hydraulic system by special stops and system moves the thread guide by parallel-link mechanisms for winding the ends. Thus, the cylindrical portion of the shell is wound when motion is transmitted from the mandrel to the thread guide by the straight section of the chain drive while for winding the ends the carriage stops and the hydraulic system pushes the thread guide towards the mandrel rotation axis; in this case the thread guide is operated by different mechanisms which have no rigid kinematic linkage between them so that this machine cannot ensure accurate winding, i.e., laying of threads tightly, without gaps and overlapping. Inaccurate winding results in a poor quality of the shells, considerable deterioration of the material structure and, in the end, low shell length.

There is one more known machine for winding shells with end plates on mandrels. This machine comprises a mechanism for rotating the mandrel around its longitudinal axis, a thread guide installed on a carriage with a provision for moving in the direction perpendicular to the mandrel axis. The carriage is mounted on a horizontal guide which is arranged parallel to the mandrel axis. The machine also comprises a mechanism for moving the carriage along the guide. This mechanism includes a endless flexible linkage whose position in space is set by master guides. The shape of the master guide in the rectangular coordinate system $x, y$ depends on the relation:

$$y = \int \sqrt{A^2 \left(\frac{d\psi}{dx}\right)^2 - 1}\, dx + C,$$

wherein $x$ is travel of the carriage with the thread guide, an abscissa of the point on the curve determining the shape of the master guide:

$\psi = f(x)$ is relation between the mandrel turning angle $\psi$ and the travel of the carriage with the thread guide;

$A$ is a constant determining the ratio of speed of the motion of the endless flexible linkage to the rotation speed of the mandrel;

$C$ is an integration constant which determines the displacement of the master guides up or down relative to the mandrel and which can be assumed to be zero;

y is an ordinate of the point on the curve determining the shape of the master guide.

The flexible linkage is coupled with the mandrel-rotating mechanism and connected with the carriage on which the thread guide is mounted. Besides, the known machine for winding shells comprises a vertical guide which mounts a second carriage installed with a provision for moving along the guide and intended to transmit motion to the vertical guide from the endless flexible linkage. The second carriage is articulated to one of the points on the endless flexible linkage.

A characteristic feature of this machine lies in that it has a rigid mechanical linkage between rotation of the mandrel and movement of the thread guide throughout the winding cycle which guarantees accurate laying of threads, without gaps and overlapping of the adjacent coils.

The flexible linkage which is an element controlling the motion of the thread guide and driving it has the shape determined by the master guides; this shape ensures winding of the threads at an angle to the mandrel rotation axis which is considerably smaller than 90° on the cylindrical portion and laying of threads on the ends to the required pattern, for example, on geodesic lines which, in combination with a certain shape of the ends, makes it possible to produce uniformly-strong shells.

However, this machine has a substantial disadvantage which lies in that an increase in the diameter of the shell being wound and, all the more so, in the ratio of the maximum shell diameter to its minimum diameter increases substantially the size of the winding machine, particularly its height which may be several times greater than the maximum diameter of the shell being wound.

OBJECTS OF THE INVENTION

An object of the present invention is to provide a machine for winding shells with end plates on mandrels which would allow winding closed large-diameter shells on geodesic lines with threads inclined at any angle to the mandrel axis.

Another object is to provide a shell-winding machine of a smaller size and, consequently, requiring less metal for its production, which would be easier in operation and would ensure high accuracy of shell winding.

Still another object of the present invention is a considerable increase in the machine productivity.

According to these and other objects, the main object of the present invention is to provide a machine for winding shells with convex ends on mandrels, for example with resin-impregnated fibreglass threads, which comprises a mechanism for rotating the mandrel around its longitudinal axis, a thread guide installed on a troverse carriage with a provision for moving in the direction perpendicular to the mandrel axis, said carriage being installed on a horizontal guide arranged parallel to the mandrel axis, a mechanism for moving the carriage along the guide, including an endless flexible linkage whose position in space is set by the master guide; the shape of the master guide in the rectangular coordinate system $x, y$ depends on the relation:

$$y = \int \sqrt{A^2 \left(\frac{d\psi}{dx}\right)^2 - 1}\, dx + C,$$

wherein $x$ is travel of the carriage with the thread guide, an abscissa of the point on the curve determining the shape of the master form;

$\psi = f(x)$ is the relation between the mandrel turning angle $\psi$ and the travel of the carriage with the thread guide;

A is a constant determining the ratio of speed of the motion of the endless flexible linkage to the rotation speed of the mandrel;

C is an integration constant assumed to be zero;

y is an ordinate of the point on the curve determining the shape of the master form;

A vertical guide is coupled to the mandrel rotating mechanism and connected to the traverse carriage with the thread guide; said vertical guide mounts a second carriage to transmit motion to the vertical guide from the endless flexible linkage; the second carriage is hingedly jointed to the endless flexible linkage and, according to the invention, the machine has one more horizontal guide which mounts a motion-transmitting installed with a provision for moving longitudinally along the latter horizontal guide and which is rigidly connected with the vertical guide and linked kinematically with traverse carriage mounting the thread guide.

It is expedient that the motion transmitting carriage which is rigidly connected with the vertical guide should be kinematically linked with the traverse carriage mounting the thread guide by means of a kinematic unit which comprises a mechanical input converter connected with the motion-transmitting carriage which is rigidly coupled to the vertical guide; said mechanical input converter converts through a transmission means the progressive motion of said motion transmitting carriage into the rotary motion of a shaft which is connected with an output mechanical converter for converting the rotary motion of the shaft into the progressive motion of the traverse carriage which carries the thread guide.

It is desirable that each mechanical converter should be constituted by an endless chain which is the simplest means for converting one kind of motion into another and which ensures a rigid kinematic linkage between the elements of the machine, i.e., a kinematic linkage without slippage.

It is recommended that the input converter for converting the progressive motion of the carriage rigidly connected with the vertical guide into the rotary motion of the shaft should be connected with the output mechanical convertor for converting the rotary motion of the shaft into the progressive motion of the traverse carriage by means of a mechanical overdrive linked kinematically with both of these converters.

This mechanical drive increases the speed and travel of the traverse carriage with the thread guide as compared with the speed and travel of the motion-transmitting carriage rigidly connected with the vertical guide by a number of times which is a multiple of the reduction ratio of the mechanical overdrive which makes it possible to wind a shell which is geometrically similar but is larger by a number of times equal to the speed ratio of the mechanical overdrive than the shell which can be round by the given shape of the endless flexible linkage; this reduces the size of the winding machines, i.e. its height. The introduction of the above-mentioned converters makes it possible to arrange the elements of the winding machine more conveniently for serving in operation, to use more efficiently the space around the mandrel which, according to the invention, is used for installing a second thread guide located diametrically opposite to the first one relatively to the mandrel and, like the first thread guide, installed on a second traverse carriage with a provision for moving relative to it in the direction perpendicular to the mandrel rotation axis while the second traverse carriage is installed on another horizontal guide arranged parallel to the mandrel rotation axis, said second traverse carriage being operated by the endless flexible linkage through a second output mechanical converter which converts the rotary motion of the shaft into the progressive motion of the second traverse carriage mounting the second thread guide.

An advantage of the winding machine according to the invention lies also in that it is adapted for spiral and curcular winding of shells. In case of spiral winding the motion of the thread guide is controlled by the endless flexible linkage. The thread guide reciprocates relative to the uniformly rotating mandrel and lays the threads at the required angle to the mandrel rotation axis, i.e., along spiral lines on the cylindrical portion of the mandrel and along complex space curves on the curved ends. When the shells are wound with the threads laid at an angle smaller than 55° to the mandrel rotation axis, spiral winding ensures the requisite strength of the cylindrical portion of the shell in the axial direction, partly in the circular direction and the strength of the ends in all directions. The lacking strength of the cylindrical portion of the shell in the circular direction is ensured by circular winding in which the threads are wound on the cylindrical portion of the mandrel in coils at an angle to the mandrel rotation axis approaching 90°. During this operation of the machine the travel of the thread guide within one revolution of the mandrel is equal to the width of the threads being wound and the thread guide motion is uniform. In this case the motion of the thread is controlled not by the endless flexible linkage but directly by the mandrel through a mechanical step-down drive and a converter which converts the rotary motion of the shaft into the progressive motion of the carriage with the thread guide. The endless flexible linkage during circular winding is cut off and is inoperative.

BRIEF DESCRIPTION OF DRAWINGS

The above objects and advantages of the present invention will become apparent from the description of the embodiment of the invention realized in practice and from the appended drawings in which.

DESCRIPTION OF PREFERRED EMBODIMENTS

Figure 1:
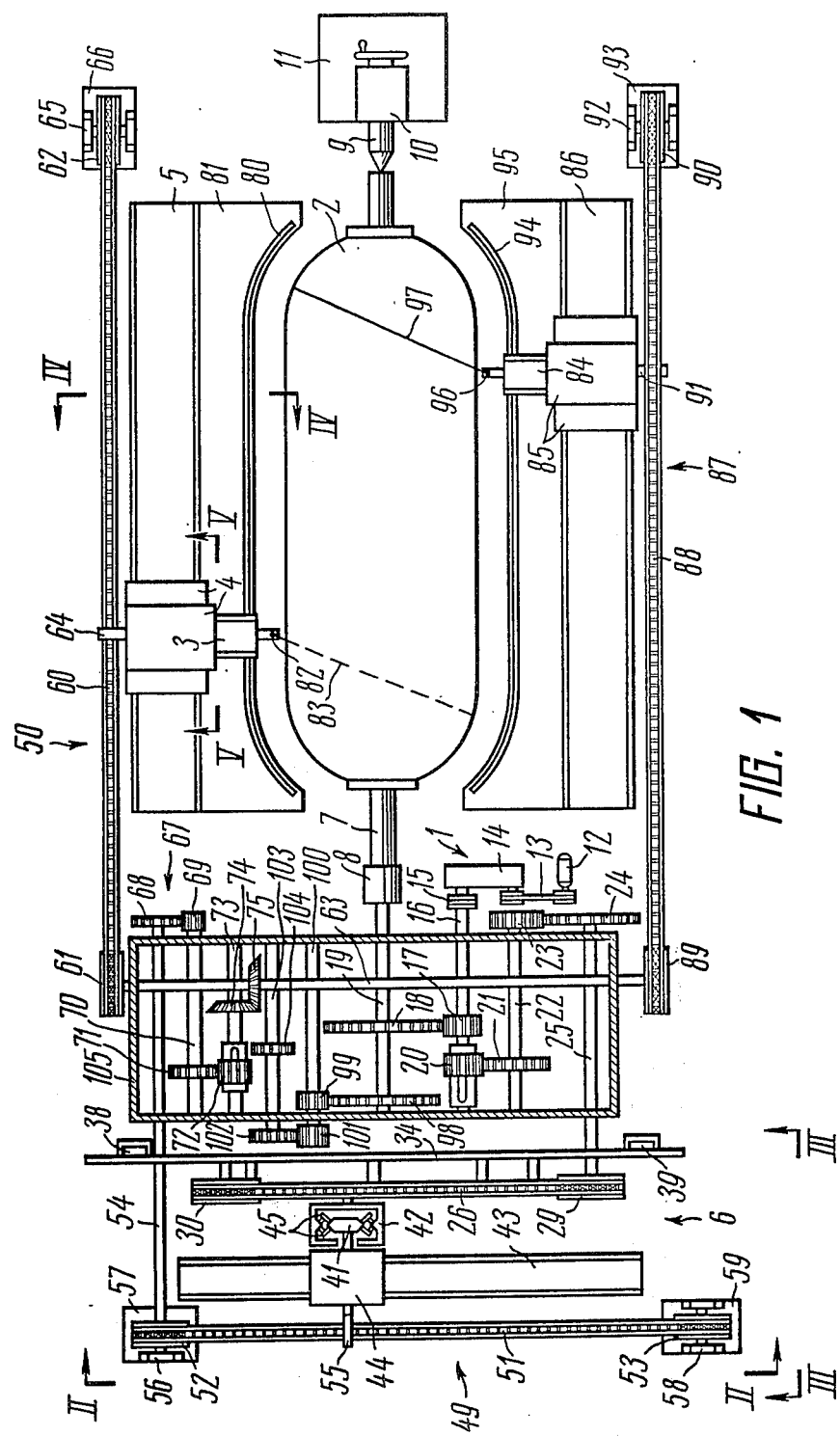
FIG. 1 is a schematic plan view of the shell-winding machine according to the invention, spiral winding operation.

The machine for winding shells with curved ends on mandrels, for example with resin-impregnated fibreglass threads, comprises a mechanism 1 (FIG. 1) for rotating a mandrel 2 around its longitudinal axis, a thread guide 3 installed on a traverse carriage 4 mounted on a horizontal guide 5, a mechanism 6 for moving the carriage 4 along the horizontal guide 5. The thread guide 3 is installed on the carriage 4 with a provision for moving relative to it in the direction perpendicular to the axis of the mandrel 2 while the horizontal guide 5 is arranged parallel to the axis of the mandrel 2. The shaft 7 of the mandrel 2 is secured in a clamping chuck 8 and in a rear stop 9 installed in a bearing 10 which is secured on a tailstock 11. The mechanism 1 for rotating the mandrel 2 comprises an electric motor 12, a V-belt drive 13, a speed reducer 14, a flexible coupling 15, a shaft 16, a gear 17 rigidly mounted on the shaft 16, a gear 18 constantly meshing with the gear 17, and a shaft 19 rigidly secured to gear 18. The shaft 19 is rigidly secured to and carries clamping chuck 8.

The motion from the shaft 16 is transmitted to the mechanism 6 for moving the carriage 4 along the guide 5 via a gear 20 which is movable along the shaft 16, a gear 21 which meshes with the gear 20 during spiral winding operation, a shaft 22 rigidly connected to and carrying gear 21, constant-mesh gears 23 and 24, and a shaft 25. The gear 23 is rigidly mounted on the shaft 22 and the gear 24, on the shaft 25, both gears transmitting motion from the mandrel 2 to the carriage 4 and coordinating accurately the rotation speed of the shaft 25 with that of the mandrel 2 and, consequently, accurately coordinating the travelling speed of the carriage 4 relative to the mandrel 2.

Figure 2:
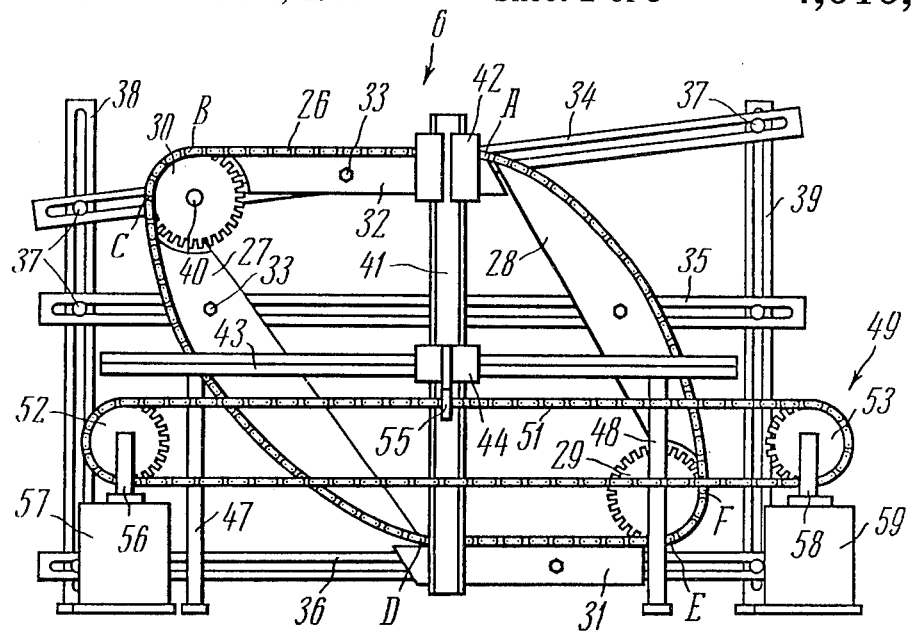
FIG. 2 is a view along arrow II—II in FIG. 1.

The mechanism 6 for moving the carrige 4 along the horizontal guide 5 comprises an endless flexible linkage 26 which in this case is constituted by a sprocket chain; the position in space of this chain is set by master forms or guides 27 and 28 (FIG. 2) whose shape in the rectangular system or coordinates $x, y$ depends on the relation:

$$y = \int \sqrt{A^2 \left(\frac{d\psi}{dx}\right)^2 - 1}\, dx + C,$$

wherein $x$ is a travel of the carriage 4 with the thread guide 3, an abscissa of the point on the curve determining the shape of the master guide $\psi = f(x)$ is relation between the turning angle $\psi$ of the mandrel 2 and the travel of the carriage 4 with the thread guide 3;

A is a constant determining the ratio of speed of the motion of the endless flexible linkage 26 to the rotation speed of the mandrel 2;

C is an integration constant assumed to be zero;

y is an ordinate of the point on the curve determining the shape of the master guide.

The chain 26 is connected to the mechanism 1 for rotating the mandrel 2 and the carriage 4 with the thread guide 3. The chain 26 is driven by a sprocket 29 rigidly mounted on the shaft 25 (FIG. 1). Like the sprocket 29 the sprocket 30 (FIG. 2) is inscribed into the trajectory of movement of the chain 26 without its distortion at the point where the radius of the trajectory of the chain 26 is at a minimum. This reduces considerably the forces of friction arising while the chain moves over the master guides 27 and 28. The master guide 31 and 32 installed on the straight sections of the trajectory of the chain 26 serve for supporting the chain 26 against sagging and for damping its vibrations. The master guides 27, 28, 31, and 32 are secured by bolts 33 to cross-bars 34, 35 and 36 which, in turn, are fastened by bolts 37 to uprights 38 and 39. The sprocket 30 rotates on a bearing 40 secured on the cross-bar 34.

Figure 3:
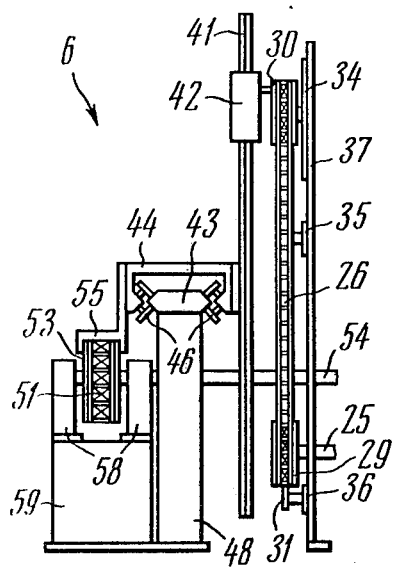
FIG. 3 is a view along arrow III—III in FIG. 1.

The known machine also comprises a vertical guide 41 which mounts a vertical-guide carriage 42 which is hingedly jointed to one of the links of the chain 26, and one more horizontal guide 43 which mounts a motion-transmitting carriage 44 is mounted rigidly connected with the vertical guide 41 and kinematically linked with the traverse carriage 4 on which the thread guide 3 is mounted. The carriage 42 is installed on the vertical guide 41 with a provision for moving longitudinally along the latter. It serves to transmit motion from the chain 26 to the vertical guide 41. The motion-transmitting carriage 44 is installed on the horizontal guide 43 with a provision for moving along the latter. The carriage 42 (FIG. 1) is capable of moving over the vertical guide 41 with the aid of four pairs of bearings 45 which are secured on the carriage 42 while the carriage 44 (FIG. 3) can move over the horizontal guide 43 with the aid of four pairs of bearings 46 secured on the carriage 44. Both the vertical guide 41 (FIG. 2) and the horizontal guide 43 are made in the form of hexahedral prisms with the bearings 45 (FIG. 1) and 46 (FIG. 3) rolling over their narrow faces. The horizontal guide 43 (FIG. 2) is installed on the foundation with the aid of uprights 47 and 48.

The endless flexible linkage, in this given example the endless chain 26 together with the sprocket 29, vertical guide 41, carriage 42 and carriage 44 constitutes a mechanical converter which converts continuous rotary motion of the sprocket 29 into variable reciprocating motion of the motion-transmitting carriage 44.

The kinematic linkage between the carriage 44 rigidly connected with the guide 41 and the traverse carriage 4 on which the thread guide 3 is mounted is effected via an imput kinematic unit comprising a mechanical converter 49 connected with the carriages 44 and an output mechanical converter 50 connected with the traverse carriage 4 on which the thread guide 3 is mounted.

The input mechanical converter 49 (FIG. 1) consists of an endless chain 51, sprockets 52 and 53, and shaft 54. The mechanical converter 49 is intended to convert the variable reciprocating motion of the carriage 44 into the variable rotary motion of the shaft 54. The chain 51 is rigidly connected with the carriage 44 via a bracket 55. The sprocket 52 is rigidly fixed on the shaft 54 whose end rests on a bearing 56 mounted on an upright 57. The sprocket 53 is supported on an upright 59 with the aid of bearings 58, the latter being capable of moving over the upright 59 for tensioning the chain 51.

The output mechanical converter 50 consists of an endless chain 60, sprockets 61 and 62, and a shaft 63. The mechanical converter 50 is intended to convert the variable rotary motion of the shaft 63 into the variable reciprocating motion of the carriage 4. The latter is rigidly connected by bracket 64 with the upper side of the chain 60. The sprocket 61 is rigidly mounted on the shaft 63 while the sprocket 62 is carried by the upright 66 with the aid of bearings 65, the latter being installed with a provision for moving along the upright 66 for tensioning the chain 60.

The mechanical converter 49 kinematically rigidly linked with the mechanical converter 50 by means of a mechanical over drive 67 forming part of a transmission means connected to and extending between the input converter 49 and the shaft 63. The overdrive 67 increases the speed and travel of the carriage 4 with the thread guide 3 over those of the carriage 44 which is rigidly connected with the vertical guide 41 by the number of times which is multiple to the speed ratio of the mechanical over-drive 67 thus making it possible to obtain winding of a shell which is geometrically similar but is larger by the number of times which is equal to the speed ratio of the mechanical overdrive 67 than the shell whose winding is ensured by the shape of the endless flexible linkage 26 which, as a matter of fact, reduces the dimensions of the winding machine, particularly its height. The transmission means which includes mechanical overdrive 67 includes a gear 68 rigidly mounted on the shaft 54, a gear 69 which is in constant mesh with the gear 68, a shaft 70 fixed to an carrying the gear 69, a gear 71 rigidly mounted on the shaft 70, a gear 72, a shaft 73 to which the gear 72, which engages the gear 71 during spiral winding, is connected for rotary movement with the shaft 73 while being capable of axial movement therealong, a bevel gear 74 rigidly mounted on the shaft 73, a bevel gear 75 which is in constant mesh with the gear 74, and the shaft 63 on which gear 75 is rigidly secured.

The carriage 4 (FIG. 4) with the aid of four pairs of bearings 76 which are mounted on the carriage 4 can move over the guide 5 secured on two uprights 77. Four pairs of bearings 78 (FIG. 5) secured on the carriage 4 allow the thread guide 3 to move relative to the latter for which purpose the thread guide 3 is provided with two rollers 79 (FIG. 4) which roll over a master cam 80 secured on a platform 81 which, in turn, is secured on the uprights 77. As can be seen from FIG. 1, the master cam 80 is a metal strip whose ends are smoothly curved along arcs towards the shaft 7 of the mandrel 2. The straight section of the master cam 80 is equal in length to the cylindrical portion of the mandrel 2. The shape of the curve is of no practical importance and the curve itself has a sole purpose of reducing the travel of the carriage 4 with the thread guide 3 beyond the length of the mandrel 2 while winding the curved ends, particularly at a small angle of the threads to the rotation axis of the mandrel 2. The guide 5 (FIG. 4) and the thread guide 3 (FIG. 5) have the form of hexahedral prisms; bearings 76 (FIG. 4) and 78 (FIG. 5) roll over the narrow faces of these prisms. The end of the thread guide 3 has an eyelet 82 (FIG. 1) for the paspassage threads 83 in the course of winding.

To cut down substantially the winding time and thus increase the efficiency of the winding machine, the latter comprises a second thread guide 84 which is arranged diametrically opposite to the thread guide 3 and is mounted with the aid of four pairs of bearings (not shown in the drawings) on a traverse carriage 85 which is installed (also on four pairs of bearings not shown in the drawings) on a horizontal guide 86. The carriage 85 is operated by a mechanical, in this case chain-type, converter 87 consisting of an endless chain 88, sprockets 89 and 90, and shaft 63. The function of the output converter 87 is similar to that of the output converter 50 since it converts the variable rotary motion of the shaft 63 into the variable reciprocating motion of the traverse carriage 85 which is rigidly connected with the lower side of the chain 88 via a bracket 91. The sprocket 89 is rigidly secured on the shaft 63 and the sprocket 90 is installed with the aid of bearings 92 on an upright 93, the bearings 92 being capable of moving along the upright 93 for tensioning the chain 88.

Figure 4:
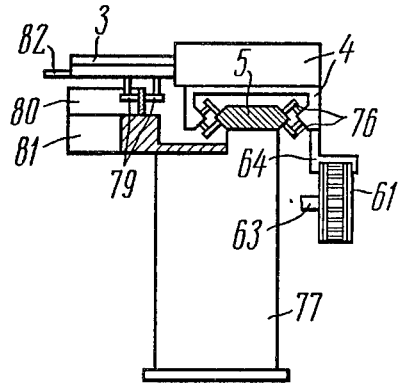
FIG. 4 is a vertical section taken along line IV—IV in FIG. 1.
Figure 5:
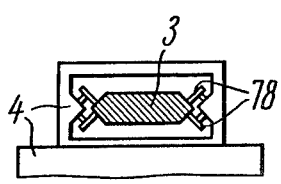
FIG. 5 is a vertical section taken along line V—V in FIG. 1.

Like the thread guide 3, the thread guide 84 can move relative to the carriage 85 by rolling with the aid of two rollers (not shown in the drawings) over a master form 94 secured on a platform 95 which, together with the horizontal guide 86, is installed on the uprights (not shown) similar to the uprights 77 (FIG. 4). The end of the thread guide 84 (FIG. 1) has an eyelet 96 through which threads 97 are pulled in the course of winding.

The above-described kinematic layout of the machine for winding shells with curved ends is intended for spiral winding when the thread guides 3 and 84 must execute a complex reciprocating motion relative to the mandrel 2. During circular winding the motion of the thread guides 3 and 84 relative to the mandrel 2 becomes considerably simpler as has been stated above. Hence, the kinematic layout of the machine can also be considerably simplified in this case. For this purpose the machine has an additionally introduced gear 98 which is capable of rotating freely relative to the shaft 19 and meshing with the gear 20 in the course of circular winding; a gear 99 which is in constant mesh with the gear 98; a shaft 100 rigidly fixed to and carrying gear 99; a gear 101 rigidly fixed on the shaft 100; a gear 102 constantly meshing with the gear 101; a shaft 103 carrying and rigidly fixed to gear 102; a gear 104 fixed rigidly on the shaft 103 and meshing with the gear 72 during circular winding. The gears 101 and 102 are intended to coordinate the travelling speed of the thread guides 3 and 84 relative to the mandrel 2 with the rotation speed of the latter in the course of circular winding, i.e. their function is similar to that of the gears 23 and 24 during spiral winding.

To conclude the description of the machine for winding shells with convex end plates on mandrels it should be noted that all the shafts mentioned in the description, i.e. shafts 16, 19, 22, 25, 54, 63, 70, 100 and 103 are mounted on rolling-contact bearings (not shown in the drawings) in the casing of the headstock 105.

OPERATION a Spiral winding

When the machine is set for spiral winding, it winds up the curved ends and the cylindrical portion of the shell; the gear 20 (FIG. 1) meshes with the gear 21 while the gear 71 meshes with the gear 72.

Before work, the ends of the threads 83 and 97 are fastened to the mandrel 2. Then the electric motor 12 is started and its rotation is transmitted via a V-belt drive 13, speed reducer 14, flexible coupling 15, shaft 16, gears 17 and 18, shaft 19, clamping chuck 8 and shaft 7 to the mandrel 2 which begins rotating at a constant speed which depends on the speed of the electric motor 12 and the speed ratio of the V-belt drive 13, speed reducer 14 and the pair of gears 17 and 18. The rotating mandrel 2 is wound with the threads 83 and 97. At the same time rotation is transmitted from the shaft 16 via the gears 20 and 21, shaft 22, gears 23 and 24 and shaft 25 to the sprocket 29 which starts rotating at a precise speed which is set by the gears 23 and 24. The rotating sprocket 29 drives the chain 26 which begins moving over the trajectory set by the master guides or forms 27, 28 and sprockets 29, 30 also at a precise speed. The vertical-guide carriage 42 connected with one of the links of the chain 26 starts moving in a vertical plane along the same trajectory as the chain 26, and begins driving the vertical guide 41 together with the motion-transmitting carriage 44 on which said vertical guide is rigidly mounted. As the carriage 42 interacts with the vertical guide 41, the motion of the carriage 42 is resolved into two components, i.e. vertical and horizontal ones. The vertical component of the motion of the carriage 42 is its motion relative to the vertical guide 41. The vertical component of the motion of the carriage 42 is not used for winding and is lost.

The horizontal component of the motion of the carriage 42 which is a projection of the motion of the carriage 42 and, consequently, of the link of the chain 26 with which the carriage 42 is connected on the horizontal axis is the motion of the vertical guide 41 together with the carriage 44 relative to the horizontal guide 43. Just this component of the motion of the carriage 42 is utilized for winding. Thus, as the carriage 42 moves over a closed trajectory of the chain 26 at a constant module speed, the vertical guide 41 and the carriage 44 will execute a variable reciprocating motion determined by the shape of the endless flexible linkage, i.e. chain 26. Hence, the shape of the chain 26, i.e. the trajectory of its motion is calculated so as to obtain the required horizontal component of the motion of the carriage 42 or, in other words, the required motion of the carriage 44.

The moving motion-transmitting carriage 44 drives the chain 51 of the input converter 49 via the bracket 55. The chain 51 drives the sprocket 52 and shaft 54 and the latter starts executing a rotary motion which is variable both with respect to speed and direction. Rotation of the shaft 54 is transmitted to the shaft 63 via the transmission means including gears 68 and 69 which make up the overdrive 67, via shaft 70, gears 71 and 72, shaft 73 and bevel gears 74 and 75; the shaft 63 starts rotating simultaneously with the shaft 54 but faster by the number of times which is equal to the speed ratio of the over-drive 67 (it is assumed that the speed ratio of the gears 71 and 72, 74 and 75 is a unity). The shaft 63 begins rotating the sprockets 61 and 89 and they, in turn, start driving the chains 60 and 88, respectively, of the output converters 60 and 87. The motion of the chains is transmitted, respectively, by the brackets 64 and 91 to the traverse carriages 4 and 85 with thread guides 3 and 84. The motion of the carriages 4 and 85 are similar to that of the carriage 44 but are faster than the speed of the carriage 44 by the number of times which is equal to the speed ratio of the overdrive 67 (assuming that the sprockets 52 and 61 have the same number of teeth). Inasmuch as the periods of motions of the carriage 44 and of carriages 4 and 85 are the same, while the speeds of motion of the carriages 4 and 85 are greater than that of the carriage 44, the travel of the carriages 4 and 85 will be greater than that of the carriage 44 by the number of times which is likewise equal to the speed ratio of the overdrive 67. In the end, the function of the overdrive 67 lies in that it is intended for winding one shell whereas the shape of the endless flexible linkage, i.e. the trajectory of the motion of the chain 26 is intended for winding another shell, geometrically similar to the first one but smaller by the number of times which is equal to the speed ratio of the overdrive 67. This contributes to a considerable reduction in the dimensions of the winding machine, mainly its height.

When the machine performs spiral winding, the threads 83 and 97 are wound on the cylindrical portion of the mandrel 2 and on the curved ends. Usually, the angle of the threads laid on the cylindrical portion of the mandrel 2 to the rotation axis of the mandrel 2 is considerably smaller than 90° they are laid on spiral lines while on the end plates they are wound along complex space curves, for example, geodesic curves. The cylindrical portion of the mandrel 2 is wound spirally during the motion of the link of the chain 26 connected with the carriage 42 or, in other words, when the carriage 42 moves along the straight section AB (FIG. 2) of the trajectory of the chain 26. The points A and B are the boundary points of the straight section on the trajectory of the chain 26. At this time the carriages 4 (FIG. 1) and 85 move relative to the mandrel 2 within the limits its cylindrical portion. The rollers 79 (FIG. 4) of the thread guide 3 and the similar rollers of the thread guide 84 (FIG. 1) roll over the straight sections of the master forms 80 and 94 which means that the thread guides 3 and 84 are immovable with relation to the carriages 4 and 85 but move together with them over the guides 5 and 86. The carriages 4 and 85 move in different directions because the carriage 4 is connected with the upper side of the chain 60 whereas the carriage 85 is linked with the lower side of the chain 88. The carriages 4 and 85 move in different directions in order to diminish the effect of inertia forces on the machine foundation.

As the carriage 42 moves over the section BCD (FIG. 2) of the trajectory described by the chain 26, the end plates of the shell are being wound. When the carriage 42 moves from point B to point C which is the extreme point of the trajectory of the chain 26 at the L.H. side, the carriage 44 and, consequently, the carriages 4 and 85 are slowed down and come to a standstill the moment the carriage 42 arrives at a point C.

As the carriage 42 moves over the trajectory of the chain 26 from point C to point D, the carriage 44 and the carriages 4 and 85 are accelerated but in the opposite directions and attain the maximum speed at which they wound the cylindrical portion of the mandrel 2 (FIG. 1) when the carriage 42 (FIG. 2) arrives at point D. At point D the curvilinear portion BCD of the trajectory of the chain 26 changes into the straight portion DE. At this time the rollers 79 (FIG. 4) of the thread guide 3 and the similar rollers of the thread guide 84 (FIG. 1) roll over the curvilinear portions of the master forms 80 and 94, i.e. the thread guides 3 and 84 move relative to the carriages 4 and 85 and, together with them, over the guides 5 and 86.

The motion of the carriage 42 over section DE (FIG. 2) of the trajectory of the chain 26 corresponds to its movement over section AB whereas its movement over section EFA corresponds to the movement over section BCD. The difference lies exclusively in that, when the carriage 42 moves over section DEFA, the carriages 4 and 85 execute motions opposite to those executed by them when the carriage 42 moves over section ABCD.

When the carriage 42 completes its movement along the entire trajectory ABCDEFA, each of the thread guides 3 and 84 will lay threads on each curved end and on the cylindrical portion of the mandrel 2 (FIG. 1) in both directions, i.e. they will make the so-called one coil or layer. To ensure placing each subsequent coil or layer on the mandrel 2 close to the preceding one, without gaps and overlapping, the speed of motion of the carriages 4 and 85 is adjusted by selecting the appropriate gears 23 and 24. The number of layers of the spiral winding is set to suit the required strength of the shell.

b. Circular winding

Figure 6:
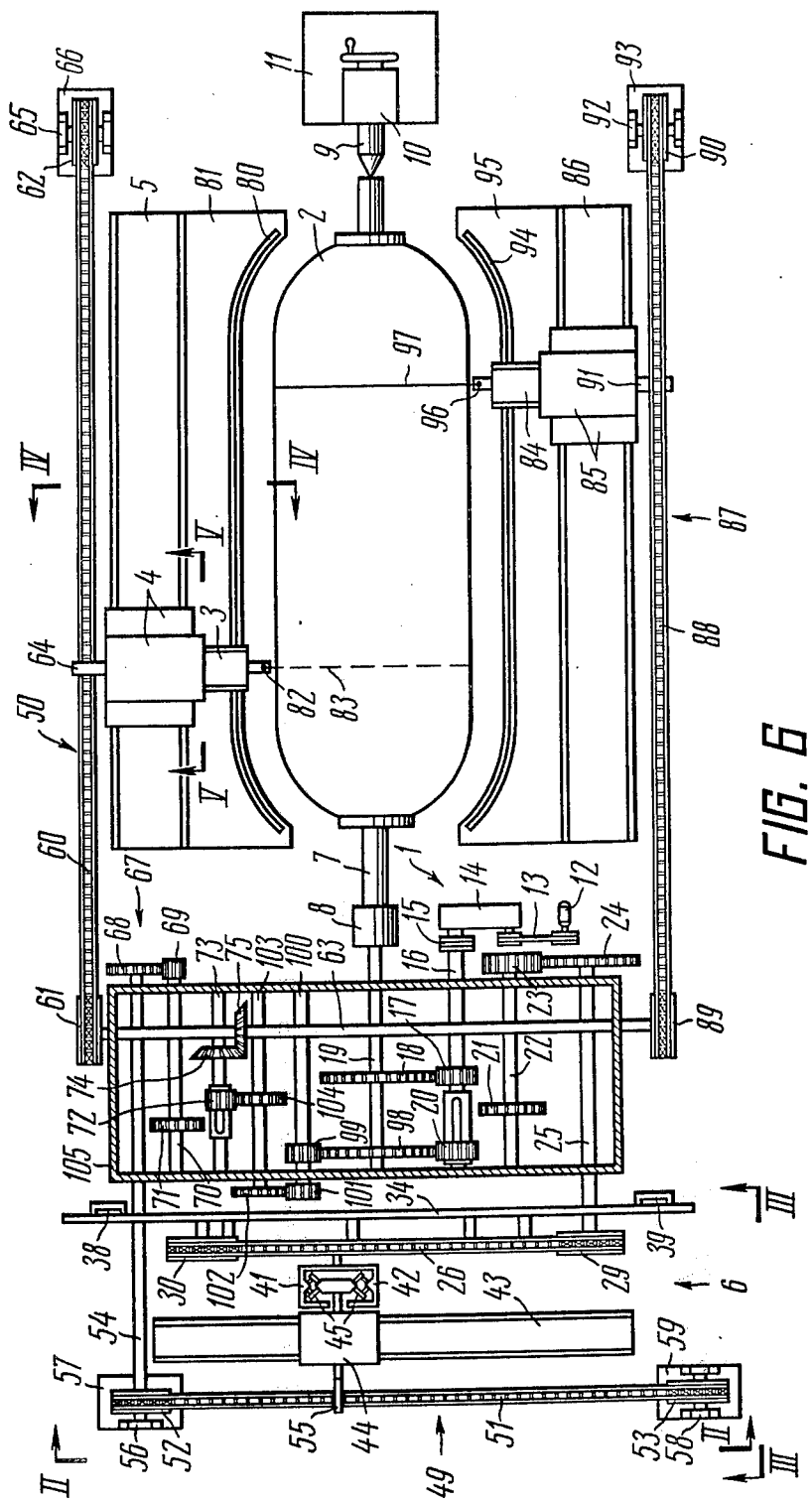
FIG. 6 is a schematic plan view of the shell-winding machine according to the invention, circular winding operation.

When the machine is used for circular winding, the thread guides 3 and 84 (FIG. 6) move within the limits of the cylindrical portion of the mandrel 2. The threads 83 and 97 are laid on the surface of the mandrel 2 at an angle of nearly 90° to the mandrel rotation axis.

Before the beginning of circular winding, the gear 20 is disengaged from the gear 21 and meshed with the gear 98 whereas the gear 72 is disengaged from the gear 71 and meshed with the gear 104. The carriages 4 and 84 with the thread guides 3 and 84 are installed on the guides 5 and 86 with the eyelets 82 and 96 of the thread guides 3 and 84 located at the ends of the cylindrical portion of the mandrel 2, i.e. at the points where the cylindrical portion of the mandrel 2 merges into the curved ends.

The threads 83 and 97 are fastened to the mandrel 2 and the electric motor 12 is started. Its rotation is transmitted to the mandrel 2 via the same route as during spiral winding, i.e. via the V - belt drive 13, speed reducer 14, flexible coupling 15, shaft 16, gears 17 and 18, shaft 19, clamping chuck 8 and shaft 7. The rotating mandrel 2 pulls out the threads 83 and 97 and thus becomes wound with them.

At this time rotation of the shaft 16 is transmitted to the shaft 63 via the gears 20, 98 and 99, shaft 100, gears 101 and 102, shaft 103, gears 104 and 72, shaft 73, and bevel gears 74 and 75. The shaft 63 is the input element of the output converters 50 and 87 which convert the rotary motion of the shaft 63 into the progressive motion of the traverse carriages 4 and 85. Rotating, the shaft 63 drives the sprockets 61 and 89 which, in turn, drive chains 60 and 88. The chains 60 and 88 actuate the carriages 4 and 85 with the thread guides 3 and 84 via brackets 64 and 91.

Within one revolution of the mandrel 2 the thread guides 3 and 84 move by the width of the threads being wound which is achieved by an appropriate selection of the speed ratio of the gear pairs 20 and 99, 101 and 102, 104 and 72, 74 and 75. The total speed ratio of these gear pairs and, consequently, the travelling speed of the carriages 4 and 85 with the thread guides 3 and 84 relative to the mandrel 2 is adjusted by appropriate selection of the gears 101 and 102, i.e. the gears 101 and 102 perform the same function as the gears 23 and 24 during spiral winding.

It has already been stated above that the thread guides 3 and 84 move within the limits of the cylindrical portion of the mandrel 2 so that the rollers 79 (FIG. 4) installed on the thread guide 3 and the corresponding rollers installed on the thread guide 84 (not shown in the drawing) roll only over the straight portions of the master cams 80 and 94 which means that the thread guides 3 and 84 are immovable relative to the carriages 4 and 85, respectively.

Inasmuch as the gears 21 and 71 do not mesh with any other gears, the endless flexible coupling 26 and the converter 49 during circular winding are inoperative.

What is claimed is:

1. A machine for winding on a mandrel a thread, such as a resin-inpregnated fibreglass thread, to form from the thread a tubular shell with convex ends, comprising:
 a mechanism for rotating a mandrel which has a central horizontal axis around its axis;
 a first horizontal guide arranged parallel to the axis of said mandrel;
 a traverse carriage installed on said horizontal guide for movement therealong;
 a thread guide installed on said carriage for movement therewith along said first horizontal guide and for movement with respect thereto in a direction perpendicular to the axis of said mandrel;
 an endless flexible linkage connected with said mandrel-rotating mechanism to be driven thereby;
 master guides engaging said endless flexible linkage for guiding and setting the position and configuration in space of said endless flexible linkage; the shape of said master guides including a curve which in the rectangular system of coordinates $x, y$ is determined by the relation:

$$y = \int \sqrt{A^2 \left(\frac{d\psi}{dx}\right)^2 - 1}\, dx + C,$$

wherein $x$ is travel of said carriage with said thread guide, an abscissa of a point on said curve determining the shape of the master guides;
 $\psi = f(x)$ is the relation between the turning angle $\psi$ of said mandrel and the travel of said carriage with said thread guide;
 A is a constant determining the ratio of speed of the endless flexible linkage to the rotation speed of said mandrel;
 C is an integration constant assumed to be zero;
 $y$ is an ordinate of the point on the curve determining the shape of the master guides;
 a vertical guide;
 a vertical-guide carriage for transmitting motion to said vertical guide from said endless flexible linkage, said vertical-guide carriage being mounted on said vertical guide for movement therealong and being articulated to said endless flexible linkage;
 a second horizontal guide;
 a motion-transmitting carriage installed on said second horizontal guide for movement therealong and rigidly connected with said vertical guide, and means linking said motion-transmitting carriage kinematically with said traverse carriage for transmitting movement of said motion-transmitting carriage to said traverse carriage.

2. A machine according to claim 1, said means comprising a kinematic unit for connecting kinematically said motion-transmitting carriage with said traverse carriage on which the thread guide is mounted; said kinematic unit including a shaft, an input mechanical converter connected with said motion-transmitting carriage and transmission means connected between said input converter and shaft for converting the progressive motion of said motion-transmitting carriage into rotary motion of said shaft; and an output mechanical converter connected with said shaft and with said traverse carriage for converting the rotary motion of said shaft into movement of said traverse carriage along said first horizontal guide.

3. A machine according to claim 2 wherein each of said mechanical converters includes and endless chain.

4. A machine according to claim 3 both of said converters comprises a mechanical overdrive located between said mechanical converter which converts the progressive motion of the carriage rigidly connected with the vertical guide into the rotary motion of said shaft and said another mechanical converter which converts the rotary motion of said another shaft into the progressive motion of the carriage on which the thread guide is mounted and which is connected with both of said converters.

5. A machine according to claim 2 and wherein said transmission means comprises a mechanical overdrive.

6. A machine according to claim 2 which comprises:
 a third horizontal guide located parallel to the axis of said mandrel;
 a second traverse carriage installed on said third horizontal guide; a second thread guide installed on said second traverse carriage for movement therewith along said third horizontal guide and for movement with respect thereto in a direction perpendicular to the axis of said mandrel; and
 a second output mechanical converter connected with the second traverse carriage and said shaft for converting the rotary motion of said shaft into progressive motion of said second traverse carriage along said third horizontal guide.

7. A machine according to claim 6 and wherein each of said mechanical converters includes an endless chain.

8. A machine according to claim 6 and wherein said transmission means includes a mechanical overdrive.

9. A machine according to claim 6 and wherein both of said output converters are in the form of endless chains each having upper and lower runs, one of said traverse carriages being operatively connected with the upper run of one of said endless chains and the other of said traverse carriages being operatively connected with the lower run of the other of said endless chains for providing equal but opposed movement of said traverse carriages with respect to each other to achieve balance in the operation of the machine.

10. A machine according to claim 2 and wherein said mandrel has opposed convexly curved ends and an elongated cylindrical portion extending between the latter curved ends, and said thread guide cooperating with said mandrel for winding thread in a spiral along said cylindrical portion of said mandrel.

11. A machine according to claim 10 and wherein said thread guide is also capable of cooperating with said mandrel for winding thread circularly along said cylindrical portion of said mandrel, and said transmission means being adjustable for connecting said mandrel-rotating mechanism to said shaft for rotating the latter without operating said flexible linkage or the parts driven thereby when said thread guide cooperates with said mandrel for winding thread circularly thereon.

* * * * *